United States Patent Office 3,449,632
Patented June 10, 1969

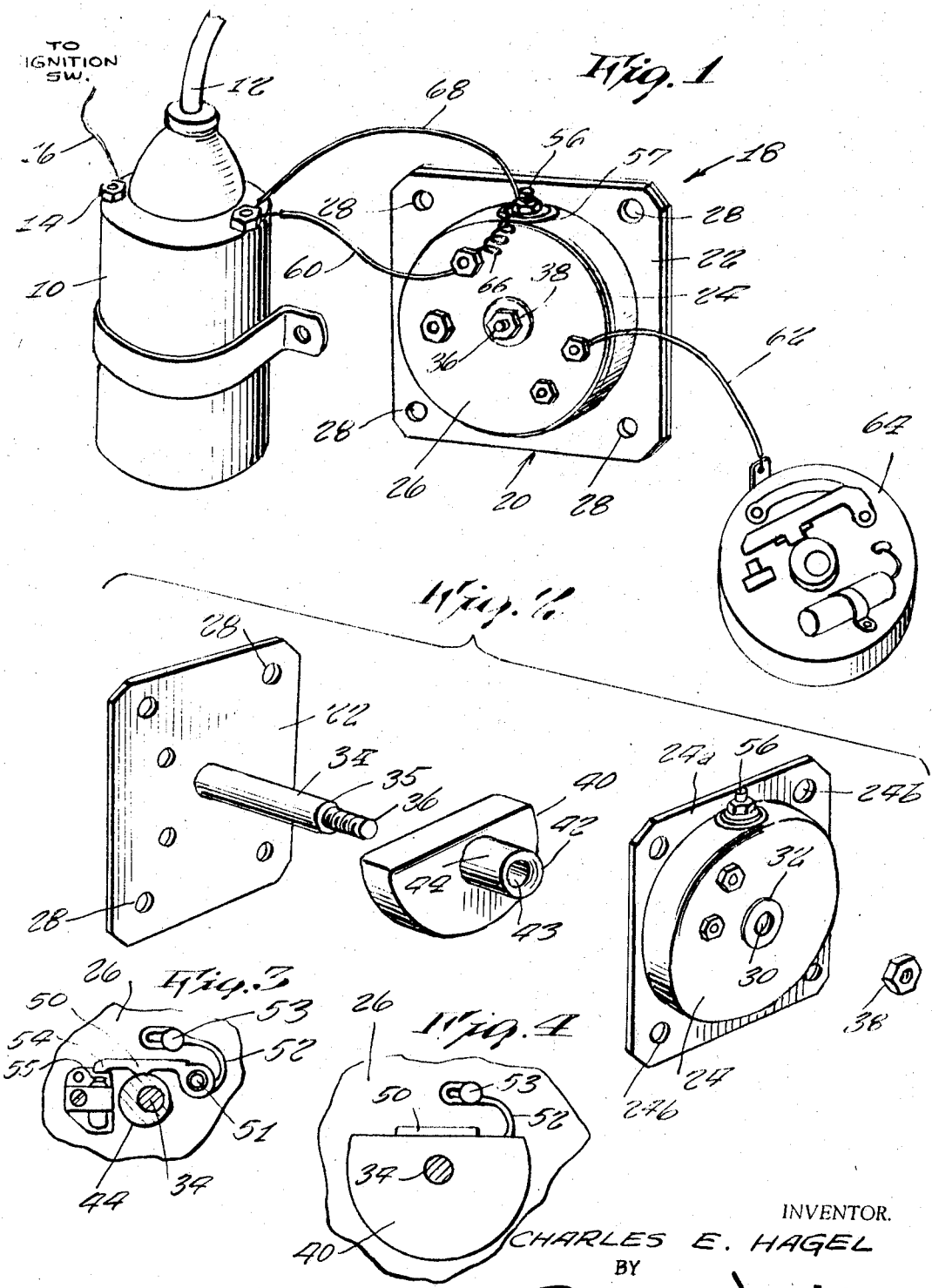

3,449,632
SAFETY CUTOUT SWITCH
Charles E. Hagel, 2002 Albany Ave., Rte. 1,
Hot Springs, S. Dak. 57747
Filed Jan. 9, 1967, Ser. No. 608,010
Int. Cl. H01h 35/02; H02h 5/00, 1/00
U.S. Cl. 317—9
4 Claims

ABSTRACT OF THE DISCLOSURE

A safety cutout switch which is provided with a circuit connection with the ignition of an automobile operative to cutoff the ignition in the event the automobile overturns to prevent a short-circuit and possible fire and further provided with a two-part housing for the safety cutout switch for mounting transversely of the automobile and providing a support for each end of a fixed shaft therein, the shaft carrying a weight swingable in a plane transverse of the automobile operative on upset of the automobile to move a contact element to open the ignition circuit, including a direct connection from the coil to a separate contact suitably located in the housing to be engaged by the movable weight on upset of the automobile operative to ground the ignition circuit to shutoff the engine, this serving as an additional safety feature should the cutout contact points fail to separate.

---

This invention relates to a safety cutout switch.

The primary object of this invention is to provide an improved safety cutout switch in circuit connection with the ignition of an automobile operative to cutoff the ignition in the event the automobile overturns to prevent a short-circuit and possible fire.

Another object of this invention is to provide a two-part housing for the safety cutout switch for mounting transversely of the automobile and providing a support for each end of a fixed shaft therein, the shaft carrying a weight swingable in a plane transverse of the automobile operative on upset of the automobile to move a contact element to open the ignition circuit.

A further object of this invention is the provision of a direct connection from the coil to a separate contact suitably located in the housing to be engaged by the movable weight on upset of the automobile operative to ground the ignition circuit to shutoff the engine, this serving as an additional safety feature should the cutout contact points fail to separate.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

FIGURE 1 is a perspective view showing the safety cutout switch connected in the circuit connections between components of the ignition circuit.

FIGURE 2 is an exploded view of the two-part switch housing and the movable weight.

FIGURE 3 is a detail elevational view of the safety cutout switch contact arm.

FIGURE 4 is a detail elevational view similar to FIGURE 3 but showing the complete movable weight in mounted position.

The herein described safety cutout switch is an improvement over the safety cutout switch as disclosed in my prior Patent No. 2,222,029, granted Nov. 19, 1940, the improvement thereover residing essentially in the housing construction and an additional circuit connection that is grounded by the movable weight on upset of the automobile in the event that the contact arm fails to move.

Referring in detail to FIGURE 1, a conventional coil 10 is shown connected by conductor 12 to a source of electric supply (not shown), and by a conductor 14 secured to binding post 16 to the automobile ignition switch (not shown). The safety cutout switch indicated generally by 18 has its operating mechanism contained within a two-part housing 20.

The housing 20 comprises a flat mounting plate 22 and a cylindrical cover plate 24 provided with a closed bottom or end wall 26. As seen in FIGURE 1, the mounting plate 22 is of square shape, and at each corner thereof there is provided a fastener receiving opening 28. The mounting plate 22 is secured on a suitable fixed part of the automobile in a vertical position and in a plane transverse to the longitudinal extent of the automobile. The cover plate 24 is of cylindrical cup shape and may be provided with a flange 24a for abutment against plate 22, the flange having openings 24b in alignment with openings 28. The end wall 26 has a central opening 30 therethrough. Preferably there is formed on the exterior of the end wall 26, a circular projecting boss 32 surrounding the opening 30. A journal shaft 34 is securely attached in any desired manner at its inner end centrally to the mounting plate 22, see FIGURE 1. At its outer end, the shaft 34 is formed to provide a shoulder 35 and a threaded extension 36. The length of the shaft 34 from mounting plate 22 to shoulder 35 is equal to the depth of the cup-shaped cover plate 24 such that with the cover plate 24 in position the threaded extension 36 will extend through opening 30 and the cover plate 24 will seat against shoulder 35. The edge of the cover plate will also engage the surface of the mounting plate. A nut 38 on threaded extension 36 serves to lock the cover plate 24 on the mounting plate 22.

A pendulum weight 40 of semi-cylindrical form is provided with a boss 42 adjacent is diametral end, there being a bore 43 through the boss and weight for reception of the shaft 34. The boss 42 is exteriorly shaped to provide a cam surface 44. On mounting the weight 40 on the shaft the boss 42 is directed towards the cover plate end wall.

Supported interiorly of the cover plate 24, on the end wall 26 is a lever 50 having one end connected to pivot 51. The lever 50 extends horizontally across the cam 44 and is resiliently held thereagainst by a leaf spring 52 anchored to the end plate 26 as at 53. The free end of the lever 50 is provided with a contact 54 engageable with a fixed contact 55 mounted on the end plate 26. With the low point of cam 44 engaging the lever 50 the contacts 54 and 55 are in abutting engagement. In my prior Patent No. 2,222,029 the lever, its mounting and the contact arrangement are shown and described in greater detail.

Arranged on the cylindrical wall directly vertically above the shaft 34 is a fixed contact post 56. The contact post 56 is held within an insulator sleeve 57 in the manner well known and is secured in place in any desired manner. The contact head (not shown) of contact post 56 is disposed within the cover plate directly in the path of movement of the pendulum weight 40 to be engaged thereby when the automobile is upset, for a purpose to be hereinafter described.

The regular ignition circuit with cut-out switch 18 included therein is by conductor 60 connecting coil 10 with fixed contact 55 and connecting contact 54 of lever 50 by conductor 62 to the distributor 64. Thus, the ignition circuit is broken when due to upset, the weight 40 will turn to cause cam 44 thereof to lift lever 50 to disengage contacts 54, 55.

An added safety feature is achieved by conductor 66 connecting fixed contact 55 with fixed contact 56. Thus, should contacts 54, 55 fail to separate the weight 40 will when it engages the contact head of contact 56 ground out the electric current and thereby shut off the engine.

In lieu of the conductor connections 60 and 66, an alternative hook-up may be effected by conductor 68 connecting coil 10 with fixed contact 56. This may be an emergency arrangement should the switch parts (lever, etc.) become broken or inoperative for any reason. Here again, engagement of the weight 40 with the fixed contact 56 will ground out the electric current to shut off the engine.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having described my invention, what I claim as new and desire to secure by Letters Patent is:

1. A safety cutout switch for use in the ignition circuit of an automobile comprising:
   (a) a two-part housing,
   (b) one said housing part consisting of a flat mounting plate,
   (c) a journal shaft rigidly secured at one end centrally to said mounting plate,
   (d) the other said housing part consisting of a cup-shaped cylindrical cover plate having an end wall a central opening therein, and a flange,
   (e) said shaft adjacent its free end having a shoulder thereon,
   (f) a threaded extension coaxial with said shaft projecting forwardly of said shoulder,
   (g) said shaft from said mounting plate to said shoulder being of a length equal to the depth of said cover plate whereby in the assembly of said coverplate on said mounting plate the threaded extension of said shaft will project through the opening in the end wall of the cover plate and with said end wall seated against the shoulder on said shaft,
   (h) a nut engageable with said threaded extension for locking the cover plate to the mounting plate, and
   (i) a weight control normally engageable contact mechanism within said two-part housing operative only when the automobile is upset to thereby effect a change in the relationship of the weight to the contact mechanism to render the same disengageable,
wherein said weight control mechanism comprises:
   (j) a lever pivoted on the cover plate end wall,
   (k) a first contact means on one end of said lever,
   (l) a second contact means supported on the cover plate end wall,
   (m) spring means associated with said lever to maintain engagement of said contact means,
   (n) a weight member swingably mounted on said shaft, and (o) cam means forming a part of said weight member engageable with said lever and so related thereto as to move the same to break the contact means engagement when the weight changes its position due to the automobile upset,
wherein:
   (p) said weight member is of pendulum form,
   (q) a boss having a cam contour on its peripheral surface extending latterally from one side of said weight member,
   (r) there being a bore extending through said boss and weight member receiving therein said shaft, and
   (s) said weight member being so positioned on said shaft that the cam boss is disposed adjacent to the end wall of the cover plate for operative engagement with said lever,
including:
   (t) a third contact means mounted on the cover-plate cylindrical wall including means insulating the same therefrom,
   (u) said third contact means being located substantially opposite the weight member in the normal position thereof,
   (v) a conductor connecting the second contact means with the third contact means,
   (w) said third contact means being engageable by said weight member when moved due to the automobile upset to effect a ground cut-out of the ignition circuit in the event said first and second contact means do not break their contacting engagement.

2. The safety cutout switch of claim 1, including:
   (a) a conductor connecting the second contact means to an ignition coil of the automobile ignition circuit, and
   (b) a conductor connecting the lever first contact means with the automobile engine distributor.

3. The safety cutout switch of claim 2, wherein:
   (a) said lever is pivoted at its other end to said cover plate end wall such as to lie in a substantially horizontal position between said cam boss and said third contact means when the first and second contact means are in engagement, and
   (b) said spring means constituting a leaf spring anchored at one end to the end wall of the cover plate and with its other end portion engageable with said lever to urge the same downwardly.

4. The safety cutout switch of claim 3, wherein:
   (a) said mounting plate is fixedly secured to a stationary part of the automobile in a vertical position and in a plane transverse to the longitudinal extent of the automobile whereby said weight member is immovable during acceleration or deceleration forces,
   (b) said mounting plate and said cover plate flange having corresponding openings for receiving mounting screws therethrough.

References Cited

UNITED STATES PATENTS 2,222,029  11/1940  Hagel _____ 200—61.48

JOHN F. COUCH, *Primary Examiner.*

J. D. TRAMMELL, *Assistant Examiner.*

U.S. Cl. X.R.

200—61, 48; 307—10